Patented May 5, 1953

2,637,740

UNITED STATES PATENT OFFICE 2,637,740

BRANCHED HIGHER ALKANOL SULFATES

Milton Kosmin, Dayton, Ohio, assignor to Monsanto Chemical Company, St. Louis, Mo., a corporation of Delaware No Drawing. Application October 20, 1950,
Serial No. 191,320

3 Claims. (Cl. 260—458)

The present invention relates to compounds having high surface-activity in aqueous solutions and to processes for preparing the said compounds.

In my prior Patents Nos. 2,508,035 and 2,508,036, issued May 16, 1950, I have disclosed polyglycol ethers of certain branched chain alcohols, namely 5-ethyl nonanol-2 and 2-n-propyl heptanol. These products are produced by condensing ethylene oxide with the respective alcohols. While these compounds show especially low and therefore advantageous wetting out speeds when aqueous solutions thereof are tested by the Draves test, these products have been found to be somewhat deficient in detergency.

I have now found that if at least 3, but less than 11, moles of ethylene oxide be condensed with 2,6,8-trimethylnonanol-4 and the resulting hydroxy ethers are converted to alkali metal sulfates there is obtained a series of products which exhibits not only excellent wetting out properties but also very good detergency.

The present products are prepared by condensing ethylene oxide with 2,6,8-trimethylnonanol-4 until at least 3 moles, but not in excess of 11 moles, have been condensed with the alcohol and then sulfating and neutralizing the resulting condensation product. The condensation may be carried out by mixing ethylene oxide either as gas or liquid with the alcohol and heating to a temperature of from 110 to 170° C. The condensation reaction is aided by the presence of a catalyst. For this purpose any alkaline materials, such as an alkali metal hydroxide or alcoholate may be used. The catalyst may be employed in relatively small amounts, usually from 0.5% to 1% being employed. The catalyst is added to the liquid alcohol at the beginning of the reaction. Sulfation of the alcohol-ethylene oxide condensate may be effected in known manner; for example by reaction with dilute or concentrated sulfuric acid, oleum, sulfur trioxide, chlorosulfonic acid, etc. The sulfuric acid esters thus obtained are then neutralized, i. e., converted to salts by treatment with an ammonium or alkali metal salt or hydroxide, e. g., sodium or potassium hydroxide or carbonate.

The products so produced are alkali metal sulfates of hydroxy ethers and are believed to have structure:

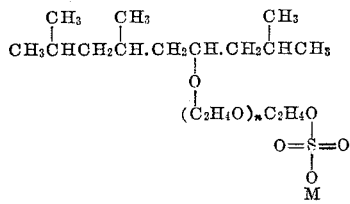

in which $n$ is an integer having a value of from 3 to 5 and M is alkali metal or ammonium.

The following examples will further illustrate this invention:

*Example 1*

1042 g. (5.60 moles) of 2,6,8-trimethylnonanol-4 was placed in a glass flask, 10.4 g. of powdered KOH added and the contents then heated to 120° C. A stream of gaseous ethylene oxide was passed into the alcohol by means of a gas dispersing tube and the stream continued until 738 g. of ethylene oxide had combined. The mass became hot due to the exothermic reaction heat and the temperature was controlled by cooling the flask by the application of cold water to the exterior. In this way the temperature was maintained at about 150° C. during the progress of the reaction.

The product obtained corresponds to the triethylene glycol ether of 2,6,8-trimethylnonanol-4. To 100 g. of this condensation product in some of dry dioxane there was added dropwise with ice-bath cooling and during a period of 30 minutes, 75 g. of 100% sulfuric acid. The resulting mixture was then stirred for one hour at room temperature (25° C.). Approximately 10 ml. of water and 100 ml. of ethyl alcohol were then added to the solution and the product was neutralized with 40% aqueous sodium hydroxide. The sodium sulfate which formed was filtered off and washed with alcohol. From the combined filtrate and washings the alcohol was stripped off under water pump vacuum using a Vigreux column, and the product was finally dried in a stirred reactor at a temperature of up to 65° C. and a pressure of 20 mm. There was thus obtained the sodium salt of sulfated triethylene glycol ether of 2,6,8-trimethylnonanol-4.

*Example 2*

A portion of the 2,6,8-trimethylnonanol-4-ethylene oxide condensation product obtained above, weighing 1330 g., was further treated with 368 g. of ethylene oxide using the same apparatus as described above. The product obtained corresponded to the pentaethylene glycol ether of 2,6,8-trimethylnonanol-4. 100 g. of this product was sulfated and then neutralized as described above, except that the sulfuric acid was added at a temperature of 20° C. to 30° C. and that the drying temperature was allowed to go up to 70° C. There was thus obtained the sodium salt of sulfated pentaethylene glycol ether of 2,6,8-trimethylnonanol-4.

Relative detergency may be measured by any quantitative method; however for the purpose of evaluating the present and related products I have used the method described by Jay C. Harris in Soap and Sanitary Chemicals for August and September, 1943. By the application of this method it is possible to evaluate the detergency of a product in terms of any standard detergent. For convenience I have compared the detergency of the present and related products with the detergency of Gardinol W. A., which is a commercial detergent produced by sulfating the alcohols derived by hydrogenation of cocoanut oil fatty acids.

The detergency of the present products and a related product as determined by the Harris method is illustrated in the following table.

| Alcohol Sulfates | Detergency—Percent of Gardinol 100% Active | |
|---|---|---|
| | 50 p. p. m. | 300 p. p. m. |
| Example 1 | 93 | 95 |
| Example 2 | 102 | 101 |
| Sodium 2-butyloctanol-1 sulfate | 37 | 30 |

The speed of wetting, as measured by the Draves test of the products when dissolved in water to form solutions of the indicated concentrations gave the values shown below.

| Product Tested | Draves Wetting (Seconds at percent concentration) | | |
|---|---|---|---|
| | 0.5 | 0.25 | 0.125 |
| Example 1 | 4.3 | 13.01 | 60.0 |
| Example 2 | 3.8 | 11.3 | 48.0 |

What I claim is:
1. Compounds having the formula

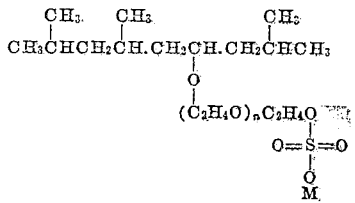

where $n$ has a value of at least 2 but not in excess of 10, and M is a member of the class consisting of alkali metal and ammonium.

2. A compound having the formula

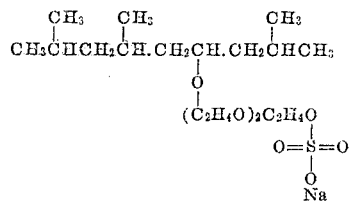

3. A compound having the formula:

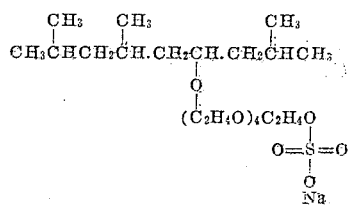

MILTON KOSMIN

References Cited in the file of this patent

UNITED STATES PATENTS

| Number | Name | Date |
|---|---|---|
| 1,970,578 | Schoeller et al. | Aug. 21, 1934 |
| 2,174,761 | Schuette et al. | Oct. 3, 1939 |
| 2,508,035 | Kosmin | May 16, 1950 |
| 2,508,036 | Kosmin | May 16, 1950 |

FOREIGN PATENTS

| Number | Country | Date |
|---|---|---|
| 810,382 | France | Dec. 28, 1936 |